United States Patent
Higuchi et al.

(10) Patent No.: US 10,377,943 B2
(45) Date of Patent: Aug. 13, 2019

(54) BLACK-TO-TRANSMISSIVE ELECTROCHROMIC DEVICE

(71) Applicants: NATIONAL INSTITUTE FOR MATERIALS SCIENCE, Tsukuba-shi, Ibaraki (JP); National Taiwan University, Taipei (TW)

(72) Inventors: Masayoshi Higuchi, Tsukuba (JP); Sheng-Yuan Kao, Tsukuba (JP); Kuo-Chuan Ho, Taipei (TW)

(73) Assignees: NATIONAL INSTITUTE FOR MATERIALS SCIENCE, Ibaraki (JP); NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 15/744,262

(22) PCT Filed: Aug. 23, 2016

(86) PCT No.: PCT/JP2016/075108
§ 371 (c)(1),
(2) Date: Jan. 12, 2018

(87) PCT Pub. No.: WO2017/034036
PCT Pub. Date: Mar. 2, 2017

(65) Prior Publication Data
US 2018/0201830 A1     Jul. 19, 2018

(30) Foreign Application Priority Data

Aug. 24, 2015 (JP) ................................. 2015-165054

(51) Int. Cl.
*C09K 9/02*     (2006.01)
*G02F 1/1503*   (2019.01)
(Continued)

(52) U.S. Cl.
CPC ............ *C09K 9/02* (2013.01); *B82Y 20/00* (2013.01); *C08G 79/00* (2013.01); *C08G 83/008* (2013.01);
(Continued)

(58) Field of Classification Search
CPC .......... G02F 1/163; G02F 1/155; G02F 1/153; E06B 2009/2464; E06B 9/24
(Continued)

(56) References Cited

U.S. PATENT DOCUMENTS

| 9,933,680 | B2 * | 4/2018 | Taya | G02F 1/1525 |
| 2005/0200935 | A1 * | 9/2005 | Liu | C07D 493/04 |
| | | | | 359/265 |
| 2016/0026055 | A1 * | 1/2016 | Choi | B05D 1/005 |
| | | | | 156/60 |

OTHER PUBLICATIONS

Hsu, C. et al., "Black-to-Transmissive Electrochromism With Visible-to-Near-Infared Switching of a Co(II)-Based Metallo-Supramolecular Polymer for Smart Window and Digital Sinage Applications", *Applied Materials and Interfaces*, vol. 7, 2015, pp. 18266-18272.
(Continued)

*Primary Examiner* — Mohammed A Hasan
(74) *Attorney, Agent, or Firm* — Brinks Gilson & Lione

(57) ABSTRACT

Disclosed is a redox-complementary electrochromic device exhibiting black-to-transmissive switching, wherein the device comprises an electrochromic layer and a redox-active material layer sandwiched between a transparent first electrode and a transparent secondary electrode, the electrochromic layer comprising an electrochromic Co-based metallo-supramolecular polymer represented by the formula (I), and the redox active material being capable of reacting with the electrochromic material to change the electrochromic material from black state into colorless transmissive state,
(Continued)

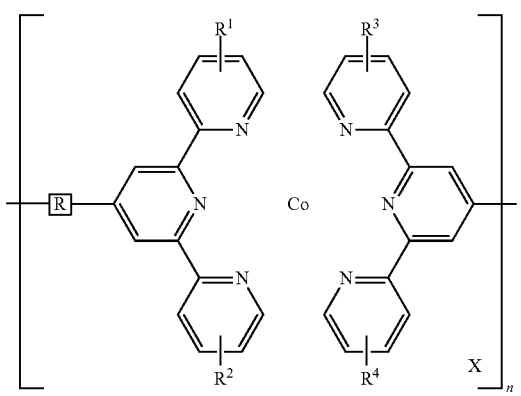

(I)

where in the formula (I), X represents a counter anion, R represents a single bond or a spacer comprising a carbon atom and a hydrogen atom, each of $R^1$ to $R^4$ independently represents a hydrogen atom or a substituent group, and n represents an integer of from 2 to 5000, which indicates a degree of polymerization.

13 Claims, 8 Drawing Sheets

(51) Int. Cl.
```
C08G 79/00    (2006.01)
G02F 1/15     (2019.01)
B82Y 20/00    (2011.01)
C08K 3/04     (2006.01)
C08G 83/00    (2006.01)
G02F 1/155    (2006.01)
G02F 1/1516   (2019.01)
B82Y 30/00    (2011.01)
G02F 1/163    (2006.01)
```
(52) U.S. Cl.
CPC .............. *C08K 3/041* (2017.05); *G02F 1/15* (2013.01); *G02F 1/1503* (2019.01); *G02F 1/155* (2013.01); *B82Y 30/00* (2013.01); *C08K 2201/011* (2013.01); *C09K 2211/1466* (2013.01); *C09K 2211/187* (2013.01); *G02F 1/15165* (2019.01); *G02F 1/163* (2013.01); *G02F 2202/36* (2013.01); *Y10S 977/742* (2013.01); *Y10S 977/952* (2013.01)

(58) Field of Classification Search
USPC .......................................................... 359/275
See application file for complete search history.

(56) References Cited

OTHER PUBLICATIONS

Lin, C. et al., "A Complementary Electrochromic System Based on a Prussian Blue Thin Film and a Heptyl Viologen Solution", *Solar Energy Materials & Solar Cells*, vol. 95, 2011, pp. 3074-3080.
Mortimer, R., et al., "Novel Color-Reinforcing Electrochromic Device Based on Surface-Confined Ruthenium Purple and Solution-Phase Methyl Viologen", *Chemsistry of Materials*, vol. 23, 2011, pp. 4077-4082.
International Search Report and Written Opinion in corresponding International Application No. PCT/JP2016/075108, dated Oct. 11, 2016, 7 pages.
Kao, S.Y. et al., "Study on Electrochromic Properties of Co-Based Organic-Metallic Hybrid Polymer", *Electronic Functional Materials Group, National Institute for Materials Science (NIMS)*, No date given, 2 pages.

* cited by examiner

BLACK-TO-TRANSMISSIVE ELECTROCHROMIC DEVICE

TECHNICAL FIELD

This invention relates to an electrochromic device, specifically to a redox-complementary electrochromic device that exhibits black-to-transmissive switching.

BACKGROUND ART

Electrochromic (EC) materials exhibiting various colors have been successfully used for commercial products such as displays, anti-glare mirrors, sunglasses, and solar-attenuated windows. Because of relatively low driving-voltage comparing to other technique such as suspension particles or liquid crystal, electrochromic device (ECD) is attractive in terms of energy-saving and sustainability.

To enhance the coloring/bleaching contrast, a redox-complementary electrochromic device has been developed (for example, see Non Patent Literatures 1 and 2). It is a device in which a pair of electrochromic materials, i.e., anodically and cathodically coloring electrochromic materials, change their colors in phase, and thus enhancing the coloring/bleaching contrast.

One of the issues in the field of the ECD is to develop a black-to-colorless transmissive device for versatile applications. However, there are only a limited number of EC materials that show black color, among which Co-based metallo-supramolecule, which may hereinafter be referred to as PolyCo, attracts attention. PolyCo has been successfully demonstrated to switch between transmissive orange and black color, mainly attributed to the d-d transition of the cobalt ion between its Co(II) and Co(I) states induced electrochemically (for example, see Non Patent Literature 3).

CITATION LIST

Non Patent Literature

Non Patent Literature1: R. J. Mortimer and T. S. Varley, Chem. Mat., 2011, 23, 4077-4082

Non Patent Literature 2: C.-F. Lin, C.-Y. Hsu, H.-C. Lo, C.-L. Lin, L.-C. Chen and K.-C. Ho, Sol. Energy Mater. Sol. Cells, 2011, 95, 3074-3080

Non Patent Literature 3: C.-Y. Hsu, J. Zhang, T. Sato, S. Moriyama, M. Higuchi, Black-to-Transmissive Electrochromism with Visible-to-Near-Infrared Switching of a Co(II)-Based Metallo-Supramolecular Polymer for Smart Window and Digital Signage Applications, *ACS Applied Materials & Interfaces* 2015, DOI: 10.1021/acsami.5b02990

SUMMARY OF INVENTION

Technical Problem

The black-to-transmissive EC material shown in the above Non-Patent Literature 3 achieves black-to-transmissive switching, but the transmissive state is not fully colorless. PolyCo derived complex having OH anions, prepared by the immersion of a PolyCo film in a basic solution (pH=13), hereinafter referred to as PolyCo-OH, is described to show black-to-yellow transmissive properties, and its response time is relatively long. PolyCo(III) would show colorless states, but it is reported to be difficult to achieve PolyCo(III) electrochemically presumably due to insufficient self-electron-exchange ability. Further, the black-to-transmissive EC material shown in Non-Patent Literature 3 is limited to an aqueous system, whereas a water-free system is preferred in most of electrical appliances.

In view of the above, the present invention is to solve the above mentioned problems with an ECD utilizing PolyCo. Specifically, one of the purposes is to achieve the colorless transmissive state with the ECD. Another purpose is to develop non-aqueous system for the ECD. Still another purpose is to improve mechanical durability of the ECD.

Solution to Problem

Surprisingly, it has been found that a redox-active material such as $K_3Fe(CN)_6$ salt successfully can promote or catalyze the transition from PolyCo(II) to PolyCo(III), achieving colorless transparent state. Such a synergy between an electric potential and a redox-active material has not been reported so far. The electrochromic materials pair shown in each of Non-Patent Literatures 1 and 2 has only two oxidation states, and their combination leads only to the enhanced color change. In contrast, the combination of PolyCo with the redox active material in the present invention enables three oxidation states, Co(I), Co(II), and an additional state Co(III), which cannot be achieved electrochemically.

Thus, the present invention is: a redox-complementary electrochromic device exhibiting black-to-transmissive switching, wherein the device comprises an electrochromic layer and a redox-active material layer sandwiched between a transparent first electrode formed on a transparent first substrate and a transparent secondary electrode formed on a transparent secondary substrate, said electrochromic layer comprising an electrochromic Co-based metallo-supramolecular polymer represented by the formula (I), and said redox active material being capable of reacting with the electrochromic material to change the electrochromic material from black state to colorless transmissive state.

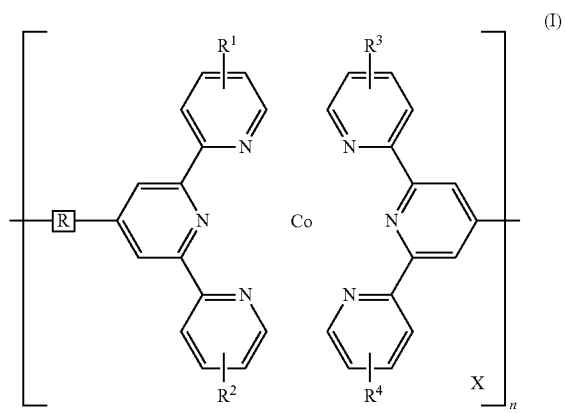

(In the formula (I), X represents a counter anion, R represents a single bond or a spacer comprising a carbon atom and a hydrogen atom, each of $R^1$ to $R^4$ independently represents a hydrogen atom or a substituent group, and n represents an integer of 2 or more, which indicates a degree of polymerization.)

Advantageous Effects of Invention

A redox-complementary electrochromic device of the present invention can be clearly switched very quickly between black and colorless transmissive states. Further, incorporation of carbon nanotubes in PolyCo film improves durability of the film without interfering the transparent state. PolyCo has been also found to function well in a non-aqueous system comprising redox-active species like ferrocene.

BRIEF DESCRIPTION OF THE DRAWINGS

FIG. 1A illustrates the cyclic voltammograms (scan rate: 0.02 V/s) of the PolyCo film in an EG solution containing 0.1 M KCl. FIG. 1B illustrates the transmittance spectra of the PolyCo film during cycling in 0.1 M KCl in EG. They show (i) a first reduced state (at ca. 0 V), (ii) a colorless state (at ca. 2.0 V) and (iii) a fully reduced state (at ca. 0 V). FIG. 1C illustrates the colorimetric analysis of the PolyCo film during cycling in 0.1 M KCl in EG. It shows (i) a first reduced state (($L^*$, $a^*$, $b^*$)=(93.4, 11.4, 17.8)), (ii) a colorless state (($L^*$, $a^*$, $b^*$)=(96.8, 2.7, 7.2)) and (iii) a fully reduced state (($L^*$, $a^*$, $b^*$)=(89.1, 5.8, 9.2)).

FIG. 2A illustrates the cyclic voltammograms (scan rate: 0.02 V/s) of the $Fe(CN)_6^{3-}$ treated PolyCo film in an EG solution containing 0.1 M KCl. The first cycle reveals two reduction reactions while only the second reduction can be observed in later cycles. FIG. 2B illustrates the transmittance spectra of the $Fe(CN)_6^{3-}$ treated PolyCo during cycling in 0.1 M KCl in EG. They show (i) an initial colorless state, (ii) a first reduced state (at ca. −1.0 V) in the first cycle, (iii) a fully reduced state (ca. −1.5 V) and (iv) cycled back to 0 V after 1 cycle. FIG. 2C illustrates the colorimetric analysis of the $Fe(CN)_6^{3-}$ treated PolyCo during cycling in 0.1 M KCl in EG. It shows (i) an initial colorless state (($L^*$, $a^*$, $b^*$)=(98.1, 0.3, 7.7)), (ii) a first reduced state in the first cycle (($L^*$, $a^*$, $b^*$)=(91.7, 13.4, 20.7)), (iii) a fully reduced state (($L^*$, $a^*$, $b^*$)=(74.2, 4.0, −4.1)) and (iv) cycled back to 0 V after 1 cycle (($L^*$, $a^*$, $b^*$)=(92.1, 12.7, 20.5)).

FIG. 3A illustrates the cyclic voltammograms (scan rate: 0.02 V/s) of the $Fc^+$ treated PolyCo film in an EG solution containing 0.1 M KCl. The first cycle reveals reduction peaks with a shoulder while the shoulder vanished in later cycles. FIG. 3B illustrates the transmittance spectra of the $Fc^+$ treated PolyCo during cycling in 0.1 M KCl in EG. They show (i) an initial colorless state, (ii) a first reduced state (at ca. −1.0 V) in the first cycle, (iii) a fully reduced state (ca. −1.5 V) and (iv) cycled back to 0 V after 1 cycle. FIG. 3C illustrates the colorimetric analysis of the $Fc^+$ treated PolyCo during cycling in 0.1 M KCl in EG. It shows (i) an initial colorless state (($L^*$, $a^*$, $b^*$)=(91.4, 4.5, 9.0)), (ii) a first reduced state in the first cycle (($L^*$, $a^*$, $b^*$)=(89.6, 8.1, 12.9)), (iii) a fully reduced state (($L^*$, $a^*$, $b^*$)=(77.2, 6.0, 1.1)) and (iv) cycled back to 0 V after 1 cycle (($L^*$, $a^*$, $b^*$)=(80.1, 18.6, 21.4)).

FIGS. 4-1A, 4-1B and 4-1C show voltammograms, transmittance spectra, and colorimetric analysis of a PolyCo/Fe(CN)$_6$ ECD of Example 1, respectively. FIGS. 4-2D and 4-2E show a dynamic transmittance curve of the PolyCo/Fe(CN)$_6$ ECD of Example 1 switched between 0 and −1.5 V, and colorimetric analysis of the PolyCo/Fe(CN)$_6$ ECD of Example 1, respectively. FIG. 4-1A illustrates the cyclic voltammograms (scan rate: 0.02 V/s) of the PolyCo/Fe(CN)$_6$ ECD. FIG. 4-1B illustrates the absorbance spectra of the PolyCo/Fe(CN)$_6$ ECD at 0 V (i.e. a colorless state), −1.0 V (i.e. a first reduced state) and −1.5 V (i.e. a fully reduced state). FIG. 4-1C illustrates the transmittance spectra of the PolyCo/Fe(CN)$_6$ ECD. They show (i) a fully reduced state at −1.5 V and (ii) a colorless state at 0 V. FIG. 4-2D illustrates the dynamic transmittance curve of the PolyCo/Fe(CN)$_6$ ECD switched between 0 and −1.5 V. FIG. 4-2E illustrates the colorimetric analysis of the PolyCo/Fe(CN)$_6$ ECD. It shows (i) a fully reduced state at −1.5 V (($L^*$, $a^*$, $b^*$)=(74.7, 2.6, 6.0)) and (ii) a colorless state at 0 V (($L^*$, $a^*$, $b^*$)=(92.1, −0.5, 9.0)).

FIG. 5A illustrates the absorbance spectra of the PolyCo-CNT/Fc ECD. They show (i) a colorless state at 0 V and (ii) a fully reduced state at −2.5 V. FIG. 5B illustrates the colorimetric analysis of the PolyCo-CNT/Fc ECD. It shows (i) a colorless state at 0 V (($L^*$, $a^*$, $b^*$)=(86.1, 3.8, 18.2)) and (ii) a fully reduced state at −2.5 V (($L^*$, $a^*$, $b^*$)=(57.8, −5.8, 9.8)). FIG. 5C illustrates the dynamic absorbance curve of the PolyCo-CNT/Fc ECD at 620 nm under repeated potential switchings between −2.5 and 0 V with a step interval of 10 s.

DETAILED DESCRIPTION OF THE PREFERRED EMBODIMENTS

Figure 7:
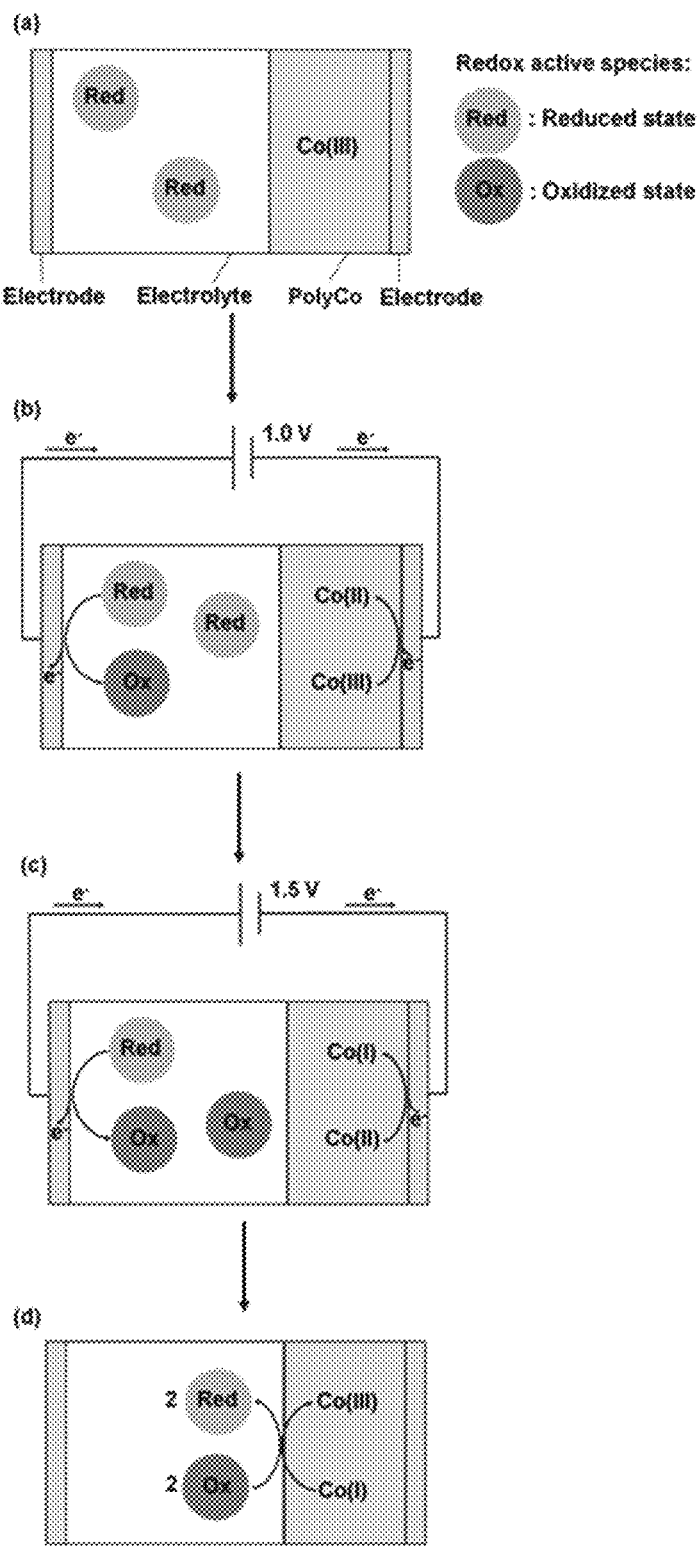
FIG. 7 schematically shows the working principle of an ECD according to the present invention. The working principle of a redox-complementary electrochromic device of the present invention is illustrated in the figure. In the stage (a), an initial colorless (PolyCo(III)) state of the ECD was present in the system. In the stage (b), a switching to the PolyCo(II) state as −1.0 V potential bias was applied. In the stage (c), a switching to the PolyCo(I) state as −1.5 V potential bias was applied. In the stage (d), a colorless state retained after being switched off.

As shown in FIG. 7, the redox-complementary electrochromic device of the present invention comprises an electrochromic layer and a redox-active material layer sandwiched between a transparent first electrode formed on a transparent first substrate and a transparent secondary electrode formed on a transparent secondary substrate. The electrochromic layer is a solid layer of polymer film, and the redox-active material layer is a solution layer comprising a redox-active material in addition to an electrolyte and a solvent.

The Co-based metallo-supramolecular polymer in the present invention, which may hereinafter be referred to as a "PolyCo", exhibits a color based on the charge-transfer absorption from Co to the bis(terpyridine) derivative as a ligand. Specifically, when a PolyCo(II) is oxidized to the corresponding PolyCo(III), the color of the polymer disappears. On the other hand, when a PolyCo(II) is electrochemically reduced to the corresponding PolyCo(I), the state of the polymer is turned to black. These phenomena can be repeatedly conducted.

In the formula (I) above, R is a single bond, which directly connects two terpyridyl groups, or a spacer for connecting two terpyridyl groups. The spacer may be a divalent organic group including a carbon atom and a hydrogen atom. Examples of such divalent organic groups include, but are not limited to, aliphatic hydrocarbon groups, alicyclic hydrocarbon groups, aromatic hydrocarbon groups, and heterocyclic groups. Of these, preferred are arylene groups, such as a phenylene group and a biphenylene group. These hydrocarbon groups may have a substituent, e.g., an alkyl group such as a methyl group, an ethyl group, or a hexyl group, an alkoxy group such as a methoxy group or a butoxy group, or a halogen atom such as chlorine or bromine. The spacer may further include an oxygen atom or a sulfur atom. The oxygen atom or sulfur atom has a modifying ability and hence is advantageous to the material design for PolyCo.

Examples of the preferred spacers include, but are not limited to, divalent arylene groups represented by the following formulae (1) to (11).

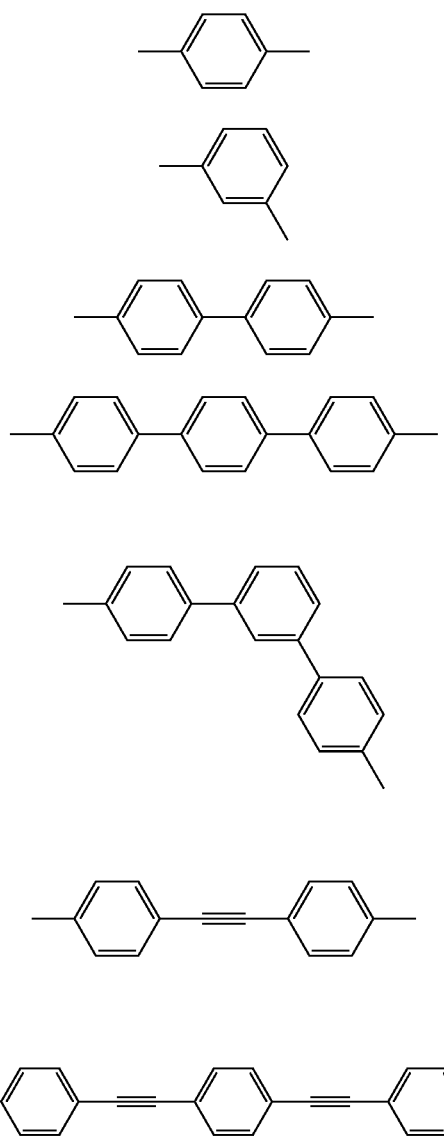

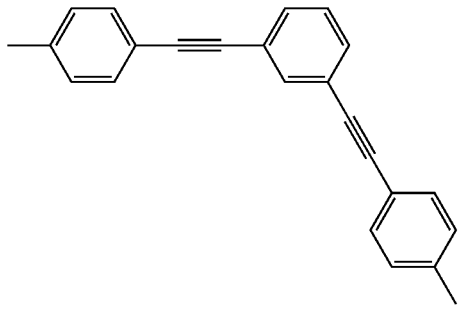

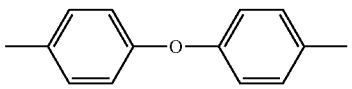

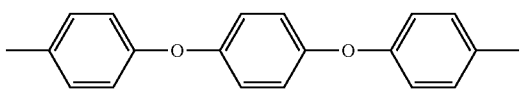

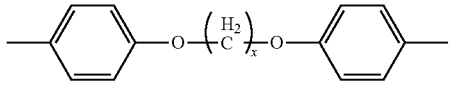

x = 4, 6, 8, 10, 12, 14, 16, 18, 20

Examples of aliphatic hydrocarbon groups constituting the spacer include, but are not limited to, C1-C12 alkyl groups, specifically, a methyl group, an ethyl group, a n-propyl group, an i-propyl group, a n-butyl group, and a t-butyl group, and further, as the divalent organic group constituting the spacer, there can be used the above groups having a substituent, e.g., an C1-C6 alkyl group such as a methyl group, an ethyl group, or a hexyl group, an alkoxy group such as a methoxy group or a butoxy group, or a halogen atom such as chlorine or bromine.

In the formula (I), X represents a counter anion. Examples of X include an acetate ion, a chloride ion, a hexafluorophosphate ion, a tetrafluoroborate ion, a polyoxometalate, and a mixture of these ions. A counter anion makes up for the charge of the metal ion to render PolyCo electrically neutral.

In the formula (I), each of $R^1$ to $R^4$ independently represents a hydrogen atom or a substituent. Examples of the substituents include, but are not limited to, a halogen atom, a C1-C10 hydrocarbon group, a hydroxyl group, a C1-C10 alkoxy group, a carbonyl group, a carboxylate group, an amino group, a substituted amino group, an amide group, a substituted amide group, a cyano group, and a nitro group. Examples of hydrocarbon groups include, but are not limited to, C1-C10 linear or branched alkyl groups, specifically, a methyl group, an ethyl group, a n-propyl group, an i-propyl group, a n-butyl group, and a t-butyl group, and further, as the substituent, there can be used the above hydrocarbon groups having a substituent, e.g., an alkyl group such as a methyl group, an ethyl group, or a hexyl group, an alkoxy group such as a methoxy group or a butoxy group, or a halogen atom such as chlorine or bromine.

In the formula (1), n represents an integer of 2 or more, which indicates a degree of polymerization, and preferably n ranges from 2 to 5,000. The degree of polymerization can be determined by using an atomic force microscope.

The redox-active material is not particularly limited, as long as it is a material that has at least two oxidation states, and is capable of reacting with a PolyCo to change the PolyCo into a colorless transmissive state. Examples of the preferred redox material include, but are not limited to, ferricyanide salts, such as $K_3[Fe(CN)_6]$, and $Na_3[Fe(CN)_6]$, and ferrocene, and (2,2,6,6-Tetramethylpiperidin-1-yl) oxyl (TEMPO).

For a PolyCo film prepared on an ITO substrate using 0.1 mg of a PolyCo, the redox-active material may be used in an amount ranging from 0.05 mol/L to 2 mol/L, typically from 0.05 mol/L to 1 mol/L.

The electrolyte contained in the redox-active material layer may be any one commonly used for electrochromic devices, preferably those having a satisfactory electric conductivity (0.2 S/m or more). Examples of the electrolyte include, but are not limited to, lithium salts such as lithium perchlorate, and lithium tetrafluoroborate, sodium salts such as sodium chloride and sodium perchlorate, potassium salts such as potassium chloride and potassium phosphate, and ammonium salts such as tetrabutylammonium perchlorate, and tetraethylammonium perchlorate.

The solvent used for the redox-active material may be water or a non-aqueous solvent that can dissolve both redox-active material and the electrolyte therein. Examples of the non-aqueous solvent include, but are not limited to, ketones such as acetone and methyl ethyl ketone, and alcohols such as methanol, ethanol and ethylene glycol.

Any known types may be used for the transparent electrode and the transparent substrate without any particular limitation. For example, the transparent first substrate may be a glass substrate having transparent first electrode formed thereon such as a film of tin-doped indium oxide (ITO), $SnO_2$, and $In_2O_3$. A resin glass using an organic material such as a transparent acrylic resin or polycarbonate resin may be used.

The transparent secondary electrode formed on the transparent secondary substrate may be composed of the same material as mentioned above for the first electrode formed on the first substrate.

The electrochromic layer may further comprise carbon nanotubes to have an increased durability. Carbon nanotubes may be single-wall, multi-wall, or a mixture of these. The amount of carbon nanotubes can be adjusted according to an intended device design or the like, but typically ranges from 0.01 to 0.1 wt % based on a weight of the electrochromic layer.

The redox-complementary electrochromic device of the present invention may be fabricated according to conventionally used procedures such as spin-coating, details of which will be shown below.

EXAMPLES

The present invention is explained with reference to the following examples, but not limited thereto. Prior to showing the examples, basic studies are shown on a Co-based metallo-supramolecular polymer film, and those treated with redox-active species, $K_3Fe(CN)_6$, and feroccene.

<Generals>

$Co(OAc)_2$, 1,4-bis(2,2':6',2"-terpyridine-4-yl)benzene, $Na_4Fe(CN)_6$, $K_3Fe(CN)_6$, and ferrocene (Fc) were purchased from Sigma-Aldrich, while $LiClO_4$, KCl, were purchased from Wako. Ethylene glycol was supplied by Kanto Chemical, and acetone was supplied from Nacalai tesque.

Electrochemical measurements were conducted in a 3-electrode system; a sample film formed on ITO was used as the working electrode; a home-made $Ag/Ag^+$ electrode was used as a reference electrode; and a Pt coil was used as a counter electrode. The $Ag/Ag^+$ reference electrode was prepared by immersing a Ag wire in an acetonitrile (ACN) solution of 0.1 M tetrabutylammonium perchlorate (TBAP) and 0.1 M $AgNO_3$, and then sealing in a glass tube with a semi-permeated film.

Electrochemical analysis was performed by potentiostat/galvanostat CHI 612 electrochemical workstation (CH Instruments, Inc., USA). A spectrophotometer (Ocean Optics, DH-2000-BAL) was used to perform optical measurements. To obtain spectra-electrochemical data, the spectrophotometer was operated in conjunction with the potentiostat/galvanostat to conduct in-situ UV-vis measurement.

<Synthesis of PolyCo(II)>

A Co-based metallo-supramolecular polymer of the formula as shown below with a degree of polymerization "n" being less than 5,000 was obtained according to the literature, F. S. Han, M. Higuchi and D. G. Kurth, Metallosupramolecular Polyelectrolytes Self-Assembled from Various Pyridine Ring-Substituted Bisterpyridines and Metal Ions: Photophysical, Electrochemical, and Electrochromic Properties. J. Am. Chem. Soc. 2008, 130, 2073-2081. A mixture of equi-molar of $Co(OAc)_2$ (16.37 mg, 92.5 μmol) and 1,4-bis(2,2':6',2"-terpyridine-4-yl)benzene (L1, 50 mg, 92.5 μmol) in 50 mL, of methanol was stirred and refluxed under $N_2$ for 24 h. After reflux, the solution was cooled to room temperature and then filtered to remove the insoluble residues. The filtrate was collected and the solvent was removed by rotary evaporation. After the solvent was removed, the collected powder was further dried in vacuo for overnight to give a Co(II)-based metallo-supramolecular polymer, hereinafter referred to as a PolyCo(II) powder with ca. 70% yield.

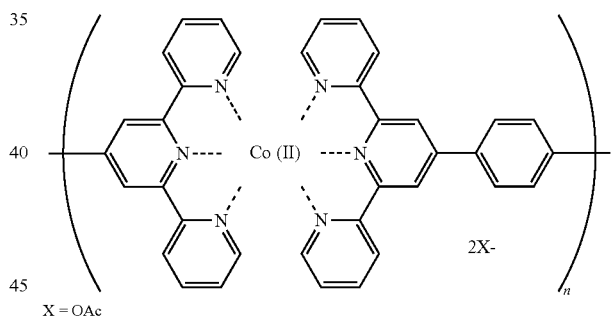

X = OAc

<Preparation of PolyCo(II) Film>

5 mg of the PolyCo(II) was dissolved in 1 mL methanol (MeOH). 75 μL of the solution was spin-coated (20 rpm. for 10 min,) on a tin-doped indium oxide (ITO) glass with a size of 2.5×2.5 cm². The size of the PolyCo(II) film was changed to 1.0×1.5 cm² by cleaning with cotton swabs before being subjected to any experiments.

<Preparation of PolyCo(III) Film Using $K_3Fe(CN)_6$>

Figure 6:
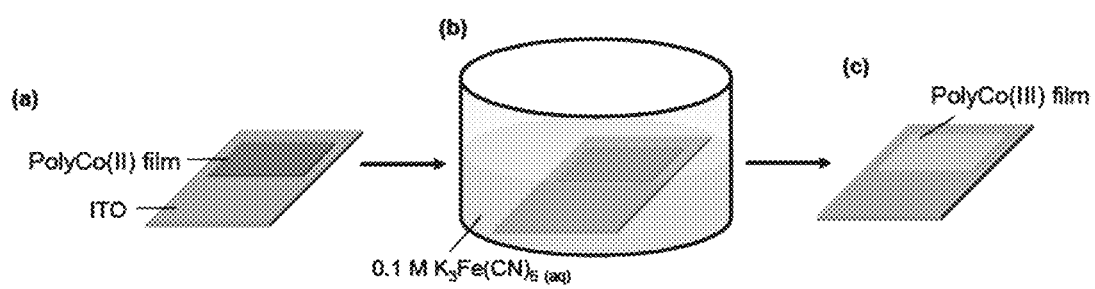
FIG. 6 schematically shows a treatment of a PolyCo(II) film with $K_3Fe(CN)_6$. A procedure of preparing PolyCo(III) through the assistance of $Fe(CN)_6^{3-/4-}$ is illustrated in the figure. In the stage (a), a PolyCo(II) coated ITO glass was prepared. In the stage (b), the glass was immersed in a 0.1 M $K_3Fe(CN)_6$ aqueous solution till the whole film turned colorless (ca. 10 s). In the stage (c), the immersed ITO was rinsed by DIW and acetone thoroughly to give PolyCo(III).

The PolyCo(II) film was immersed in a 0.1 M $K_3Fe(CN)_6$ aqueous solution as shown in FIG. 6 for ca. 10 seconds till the film's color changed from orange to colorless. A PolyCo (III) film was then obtained by rinsing thoroughly with deionized water (DIW) and then drying. The $Fe(CN)^{3-}$ ions served as oxidants and uniformly oxidized Co(II) to Co(III) while $Fe(CN)_6^{3-}$ was reduced to $Fe(CN)_6^{4-}$ to give the PolyCo(III).

Similarly, a PolyCo(III) film was also generated by immersing the PolyCo(II) film in an acetone solution containing $Fc^+$ and rinsing with DIW and following the same procedures as mentioned above. The acetone solution containing $Fc^+$ was obtained by electrochemically oxidizing the acetone solution containing 0.1 M Fc and 0.1 M $LiClO_4$ (under a three-electrode system by applying 1.0 V (vs. $Ag/Ag^+$) for ca. 2000 s).

<Preparation of PolyCo(III) Film Using Ferrocene>

The PolyCo(II) film was immersed in an acetone solution containing 0.1 M oxidized ferrocene ($Fc^+$) prepared by electrochemically oxidizing an acetone solution containing 0.1 M ferrocene (Fc) and 0.1 M $LiClO_4$ by applying 1.0 V (vs. $Ag/Ag^+$) for ca. 2000 s.

<Properties of PolyCo>

Figure 1A:
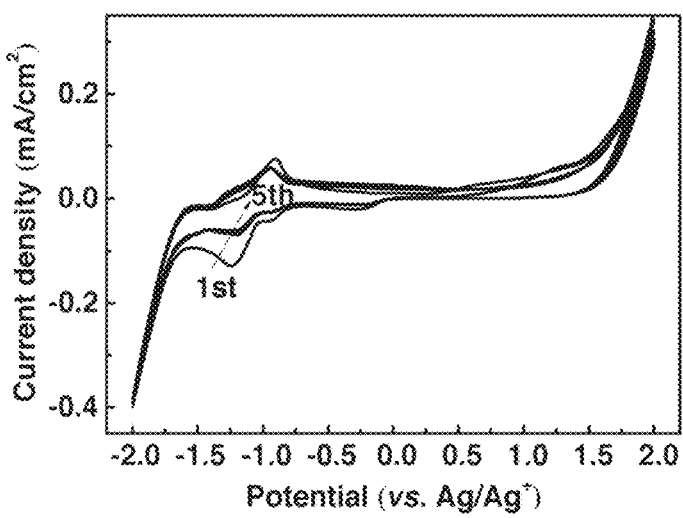
FIGS. 1A, 1B and 1C show cyclic voltammograms, transmittance spectra, and colorimetric analysis of a PolyCo film, respectively.

Cyclic voltammograms of the PolyCo film are presented as FIG. 1A. A pair of well-defined redox peaks spanned from −0.8 to −1.5 V are attributed to the transition from Co(II) state to Co(I) state. On the contrary, no significant reversible redox peaks were observed at positive voltage.

According to the above-mentioned literature, Applied Materials & Interfaces 2015, the redox couple for the transition between PolyCo(II) and PolyCo(III) is supposed to appear at ca. −0.144 (vs. $Ag/Ag^+$). This indicates the ineffective transition from PolyCo(II) to PolyCo(III). The same observation has also been noticed by several literatures. And it has been pointed out that it is due to a sluggish self-exchange electron transfer rate from PolyCo(II) to PolyCo(III) that leads to such ineffective bleaching reaction of PolyCo(II).

In terms of its optical behavior, the PolyCo film originally possesses orange hue (seen in the solid curve of FIG. 1B) indicating the Co(II) state of the PolyCo. As the cycling potential reached more negative than −1.5 V, the color of the PolyCo gradually change from orange to black, indicating that the PolyCo(II) was converted to the PolyCo(I). On the other hand, the color of the film would become less colored only when an extreme potential bias of ca. 2.0 V was applied, at which the irreversible current signal occurred (as indicated in FIG. 1A). This result also corresponds well to reports of literatures suggesting that a PolyCo(III) was hard to obtain by solely using electrochemical methods. In fact, the PolyCo film was noticed to gradually waft back to the electrolyte when the applied potential went higher than ca. 1.8 V, which has also been reported previously.

Figure 1B:
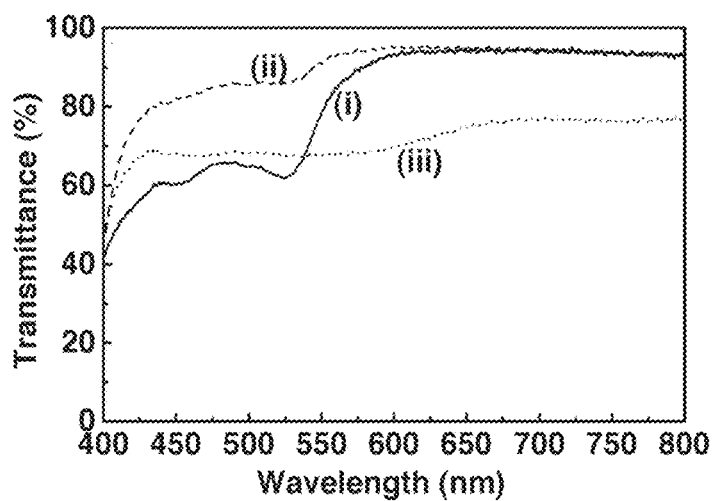
Figure 1C:
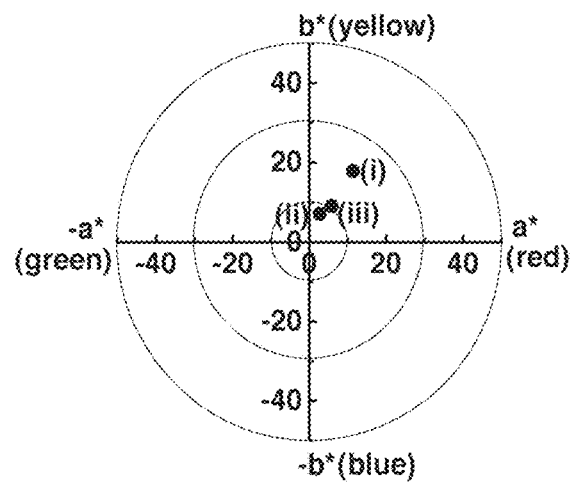

Colorimetric analysis of the PolyCo film was also performed and presented on the CIE L*a*b* coordinate (FIG. 1C). Both colors of the PolyCo(III) and the PolyCo(I) lie rather close to the CIE black (FIG. 1C), however, the extreme potential bias for PolyCo(III) generation would significantly destroy the film. Strictly speaking, it was not feasible to harness the black-to-transmissive characteristics of PolyCo by solely utilizing electrochemical methods. Therefore, redox-active species were introduced to induce the effective generation of a PolyCo(III) as addressed in the following section.

<Properties of $Fe(CN)_6$ Treated PolyCo>

Figure 2A:
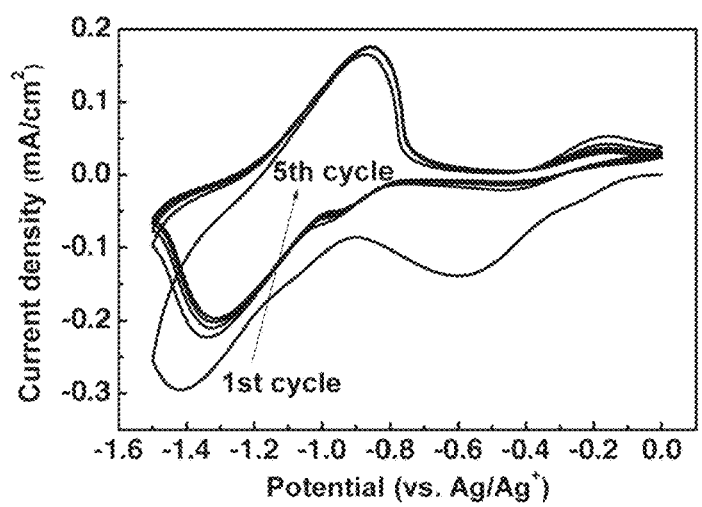
FIGS. 2A, 2B and 2C show cyclic voltammograms, transmittance spectra, and colorimetric analysis of an $Fe(CN)_6^{3-}$ treated PolyCo film, respectively.

The orange color of the PolyCo(II) film changed to colorless as soon as it was immersed into a 0.1 M $K_3Fe(CN)_6$ aqueous solution. This result indicates that the PolyCo(II) was converted to the corresponding PolyCo(III). This $K_3Fe(CN)_6$ treated colorless film was then subjected to cyclic voltammetry in an ethylene glycol (EG) solution containing 0.1 M KCl shown in FIG. 2A. A significant and broad reduction peak spanned from −0.1 to −0.8 V can be inspected in the first cycle. Further a negative applied potential induced another reduction peak spanned from −0.9 to −1.5 V. This reduction reaction corresponds well to the transition from the PolyCo(II) to the PolyCo(I). Inferring from this result, the reduction peak at −0.1 to −0.8 V was able to be assigned to the reduction from the PolyCo(III) to the PolyCo(II).

Figure 2B:
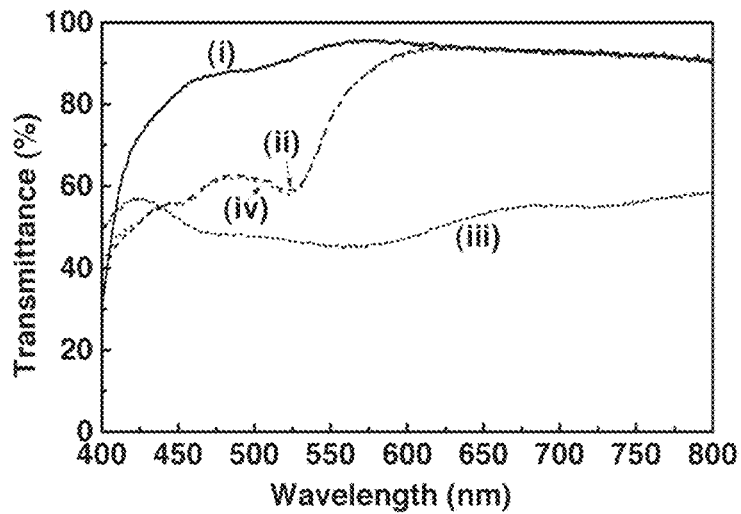

The corresponding transition in its optical property is presented in FIG. 2B. Initially, the PolyCo(III) showed colorless hue (see a solid line in FIG. 2B). Its color changed from colorless to orange (see a dashed curve in FIG. 2B), which suggests that the PolyCo(II) was generated, as the applied potential was swept to −0.8 V. The color of the film further changed from orange (the PolyCo(II)) to black (the PolyCo(I): see a short-dashed curve of FIG. 2B) as the applied potential went even more negative. As the potential returned to 0 V after a complete cycle, the colorless PolyCo (III) was not obtained. Instead, only the characteristic orange absorbance spectrum of the PolyCo(II) was noticed (see a dotted curve in FIG. 2B), which suggests the existence of the redox-active species to generate the PolyCo(III).

Figure 2C:
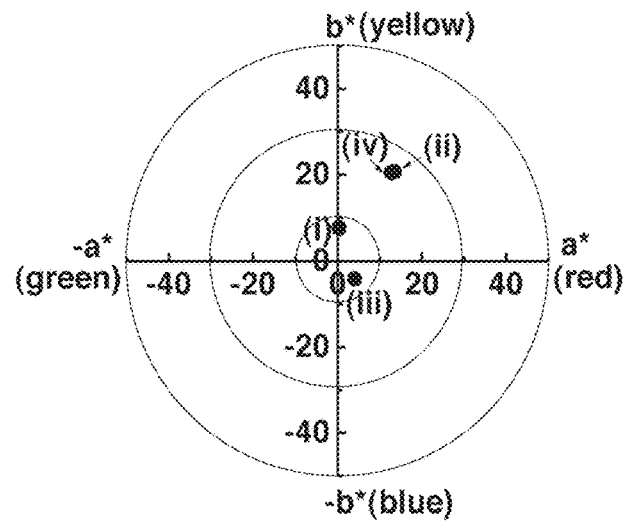

An attractive black-to-transmissive property of this PolyCo film was noticed from the colorimetric analysis (FIG. 2C). Initially, the colorless PolyCo(III) was located at (0.3, 7.7) on the coordinate. After undergoing a two-stage EC transition to the PolyCo(I), it was located at (4.0, −4.1). Both states were located very close to the CIE black, which suggests that a good black-to-transmissive property was able to be obtained if all three states of the PolyCo were fully harnessed.

<EC Properties of Ferrocene Treated PolyCo>

Figure 3A:
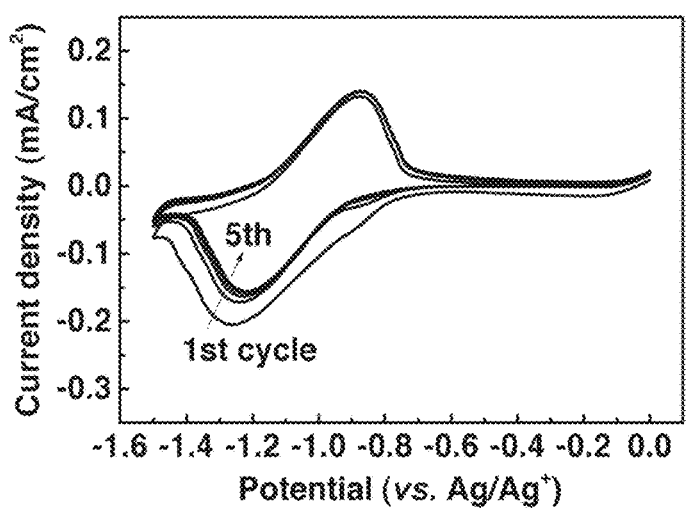
FIGS. 3A, 3B and 3C show cyclic voltammograms, transmittance spectra, and colorimetric analysis of an $Fc^+$ treated PolyCo film, respectively.

This treated colorless film was again subjected to cyclic voltammetry in an EG solution containing 0.1 M KCl as presented in FIG. 3A. A larger reduction current and a shoulder at ca. −0.85 V were observed in the first cycle. Another redox couple was noticed as the applied potential went further negative, indicating the reduction reaction to form the PolyCo(I). After one cycling, the shoulder observed in the first cycle vanished, which suggests the lack of the PolyCo(III) generation.

Figure 3B:
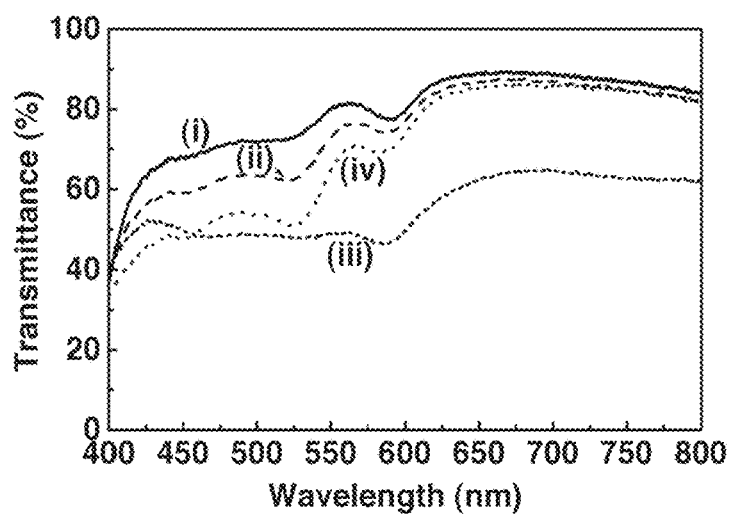
Figure 3C:
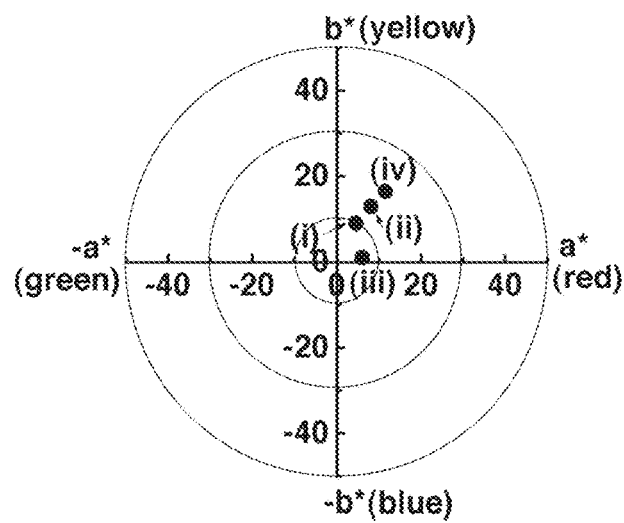

Its corresponding optical property is presented in FIG. 3B. The high transparency in the visible wavelength region (see a solid curve in FIG. 3B) indicates the existence of the colorless PolyCo(III) after the immersion of an $Fc^+$ solution. This film gave a homogeneous visible light attenuation in the entire visible wavelength upon application of the reduction potential (see a short-dashed curve in FIG. 3B). After one potential cycling and returning to 0 V, the absorbance at ca. 400-550 nm remained (dotted curve in FIG. 3B), which indicates that the film was at the PolyCo(II) state being orange. A desirable black-to-transmissive property of the $Fc^+$ treated PolyCo was verified by the colorimetric analysis as shown in FIG. 3C, where a* and b* values of both the PolyCo(I) and the PolyCo(III) lied within the range between −10 to 10.

The properties of the above PolyCo with and without redox-active species are summarized in Table 1. Smaller potentials were required to achieve the black-to-transmissive characteristics with the assistance of redox-active species comparing to plain PolyCo, which enables all three states of the PolyCo to be utilized so as to yield the black-to-transmissive property.

Trying to achieve a PolyCo based black-to-transmissive ECD, the present inventors have therefore arrived at the concept of a redox-complementary ECD configuration by the introduction of these redox-active species. By utilizing this ECD configuration, the assisted redox-active species can simultaneously act as a counter material for the PolyCo and induce the presence of the colorless PolyCo(III).

TABLE 1

EC properties of PolyCo at oxidized and reduced states, with and without redox-active species assistance

| Redox materials | none | $Fe(CN)_6^{3-}$ | $Fe^+$ |
|---|---|---|---|
| Potential of colorless state (vs. Ag/Ag$^+$) | 2.0 | 0 | 0 |
| Potential of fully reduced state (vs. Ag/Ag$^+$) | −2.0 | −1.5 | −1.5 |
| (L\*, a\*, b\*) at colorless state | L\*: 96.8, a\*: 2.7, b\*: 7.2 | L\*: 98.1, a\*: 0.3, b\*: 7.7 | L\*: 91.4, a\*: 4.5, b\*: 9.0 |
| (L\*, a\*, b\*) at fully reduced state | L\*: 89.1, a\*: 5.8, b\*: 9.2 | L\*: 74.2, a\*: 4.0, b\*: −4.1 | L\*: 77.2, a\*: 6.0, b\*: 1.1 |

Example 1

Preparation of PolyCo/Fe(CN)$_6$ ECD

A PolyCo(II) film coated ITO electrode (assigned as the working electrode) was laminated with another bare ITO electrode which pre-drilled with two holes (assigned as the counter electrode). The gap between these two electrodes was controlled to 60 µm by one layer of Surlyn®. An aqueous solution containing 0.1 M Na$_4$Fe(CN)$_6$ and 0.1 M KCl was filled between the gap through the drilled holes.

The holes were sealed by an epoxy adhesive. The ECD thus obtained is hereinafter referred to as a PolyCo/Fe(CN)$_6$ ECD, wherein the PolyCo represents a Co-based metallo-supramolecular polymer with Co being any one state of Co(I), Co(II), and Co(III).

Example 2

Preparation of PolyCo-CNT/Fc ECD

A PolyCo-CNT film was obtained according to the same procedures as used for obtaining the PolyCo film except that 0.05 wt % of multi-walled carbon nanotubes (CNT) based on the weight of the PolyCo(II) were added to an ink containing 5 mg of the PolyCo(II) dissolved in 1 mL methanol.

A PolyCo-CNT based ECD containing a ferrocene (Fe$^{0/+}$) redox couple was obtained by laminating the PolyCo-CNT film coated ITO (assigned as the working electrode) with another bare ITO electrode which pre-drilled with two holes (assigned as the counter electrode). The gap between these two electrodes was controlled to 60 µm by one layer of Surlyn®. An acetone solution containing 0.1 M LiClO$_4$ and 0.1 M ferrocene (Fc) was filled into the gap between these two electrodes through the drilled holes. The holes were sealed by an epoxy adhesive to obtain the ECD.

<EC Properties of PolyCo-Fe(CN)$_6$ ECD of Example 1>

The working principle of the PolyCo-Fe(CN)$_6$ ECD is shown and illustrated in FIG. 7. When the potential bias is equal to 0 V, the PolyCo is at Co(III) state while a sufficient amount of the redox active species exist in the electrolyte (as illustrated in stage (a) in FIG. 7). When −1.0 V is applied to this ECD (as illustrated in stage (b) in FIG. 7), the PolyCo (III) would be reduced electrochemically from Co(III) to Co(II) state. At the same time, Fe(CN)$_6^{4-}$ in the electrolyte would be oxidized at the counter electrode and convert into Fe(CN)$_6^{3-}$. Part of Fe(CN)$_6^{3-}$ would diffuse and react with the PolyCo(II), converting the Co(II) to Co(III) state while Fe(CN)$_6^{3-}$ was reduced to Fe(CN)$_6^{4-}$ (as illustrated in FIG. 7, such a reaction is also called a recombination reaction). However, this PolyCo(III) would soon acquire electrons from the outer circuit and then converted back into Co(II) state again due to the application of a potential bias. When −1.5 V is applied to the ECD (illustrated in stage (c) in FIG. 7), the PolyCo(II) can be reduced to the PolyCo(I) state and exhibits black color. Similarly, the recombination reaction between Fe(CN)$_6^{3-/4-}$ and the PolyCo can occur constantly. When the applied potential is switched off (as illustrated in stage (d) in FIG. 7), the supply of the current from the outer circuit stops while the recombination continues. Therefore, all of the PolyCo can be oxidized back to the Co(III) state and again reveals the colorless state, and therefore a reversible black-to-transmissive ECD can be achieved.

Figures 1A, 4:
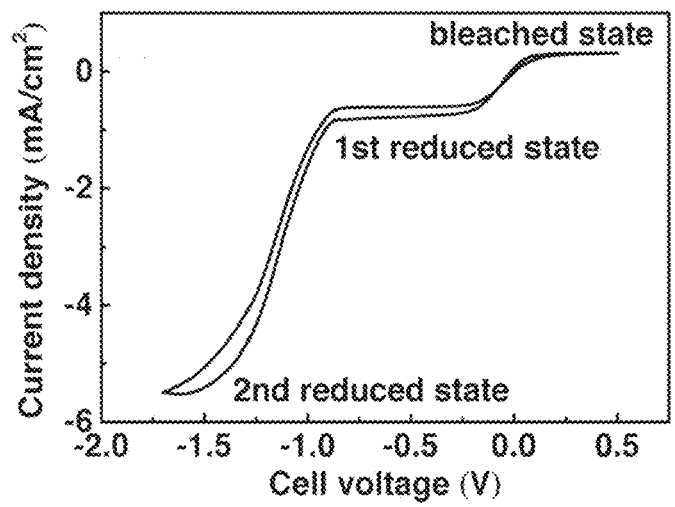
Figures 1B, 4:
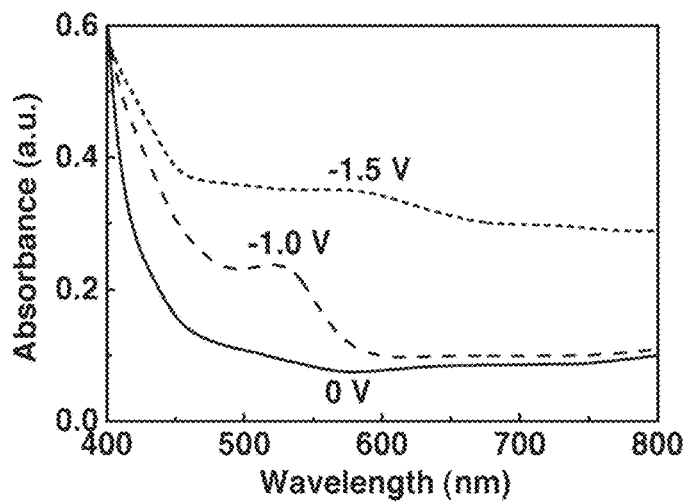
Figures 1C, 4:
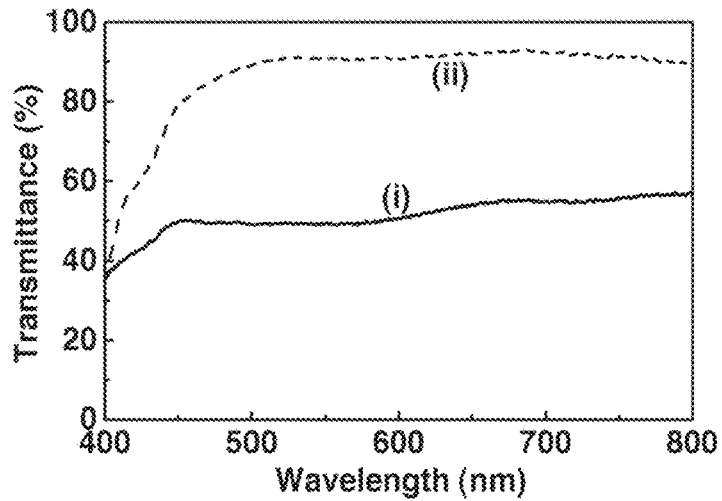
Figures 2D, 4:
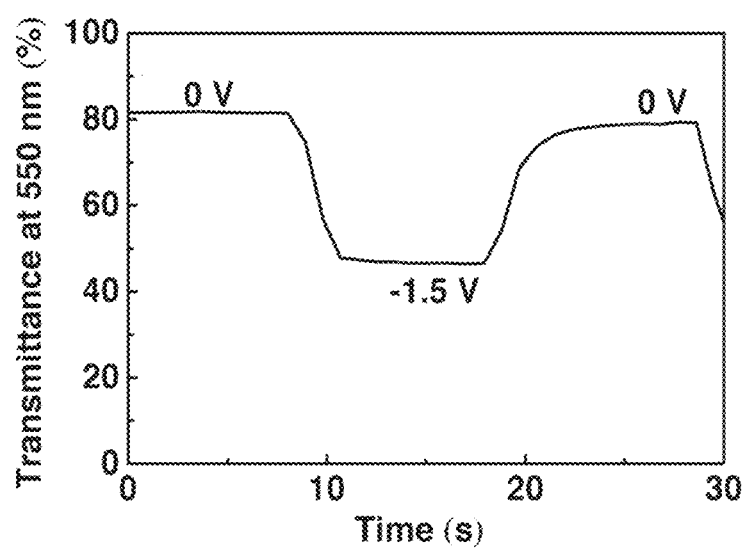
Figures 2E, 4:
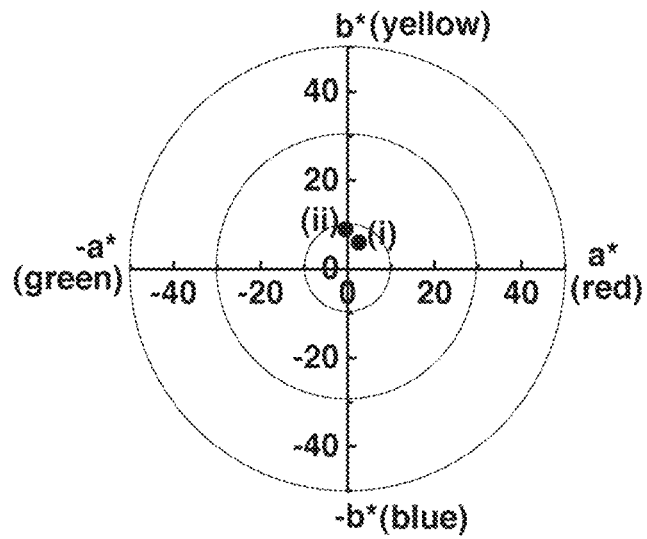

FIG. 4-1A presents cyclic voltammogram of the PolyCo/Fe(CN)$_6$ ECD. The stepwise current signal indicates the constant supply of electrons as discussed above. The corresponding optical behavior is shown in FIG. 4-1B, which suggests that the two-stage and black-to-transmissive property of the PolyCo can fully be harnessed. When the PolyCo/Fe(CN)$_6$ ECD was subjected to alternating potential steps between 0 and −1.5 V, the corresponding absorbance spectra are shown in FIG. 4-1C. FIG. 4-2D reveals its reversibility through the dynamic transmittance curve at 550 nm. An attractive black-to-transmissive property was observed as seen in the colorimetric analysis in FIG. 4-2E.

<EC Properties of PolyCo-CNT/Fc ECD of Example 2>

Figure 5A:
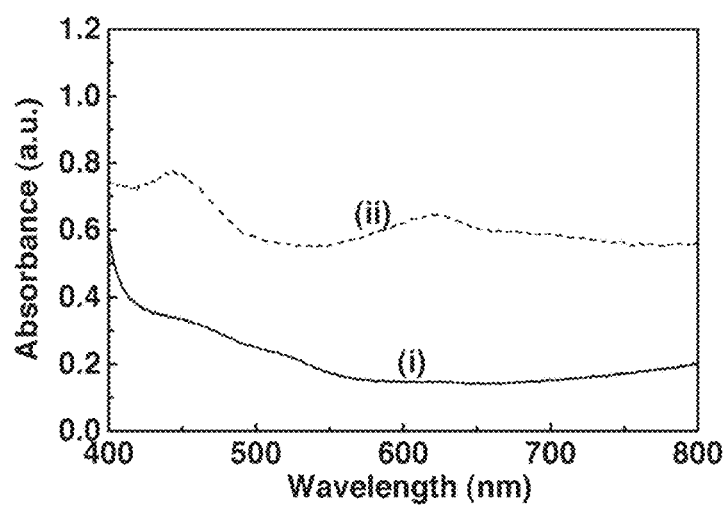
FIGS. 5A, 5B and 5C show absorbance spectra, a colorimetric analysis, and a dynamic absorbance curve of a PolyCo-CNT/Fc ECD of Example 2, respectively.
Figure 5B:
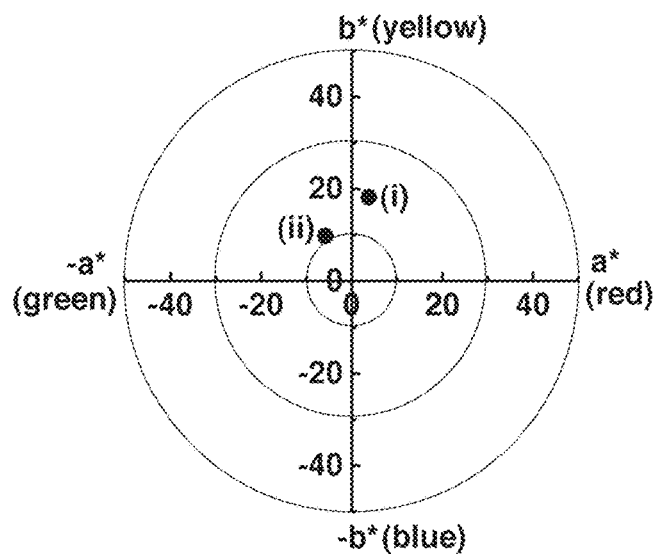

The redox-active ferrocene (Fc), which possesses a redox (Fc/Fc$^+$) formal potential of 0.05 V (vs. Ag/Ag$^+$), was introduced into the PolyCo film to fabricate a redox-complementary ECD. Besides, the addition of carbon nanotubes (CNT) to the PolyCo film (i.e. the formation of the PolyCo-CNT) caused further increase in the stability during potential switching. The electrochemical and optical performances of the ECD are presented in FIGS. 5A, 5B and 5C. As a potential bias of −2.5 V was applied to the ECD, the absorbance was elevated at almost of the entire visible light region. Such a strong absorption of visible light was contributed by both the PolyCo and Fc$^+$. As suggested from the dashed curve of FIG. 5A, the enhancement in the visible light absorption was verified from the additional absorption peak located at 620 nm, which was attributed to Fc$^+$. When the potential bias of the PolyCo-CNT/Fc ECD was returned to 0 V, the absorbance spectra of the ECD (see a short-dashed curve in FIG. 5A) became colorless since the Fc$^+$ in the ECD induced the oxidation of the PolyCo-CNT film to the colorless PolyCo(III) state. Even though Fc and Fc$^+$ in the ECD give an extra light absorption aside from that of the PolyCo-CNT itself, good black-to-transmissive characteristics of the ECD can still be obtained since the a\* and b\* values under both the fully reduced state and the colorless state are all within a reasonable range of −20 to 20 (as suggested in FIG. 5B).

Figure 5C:
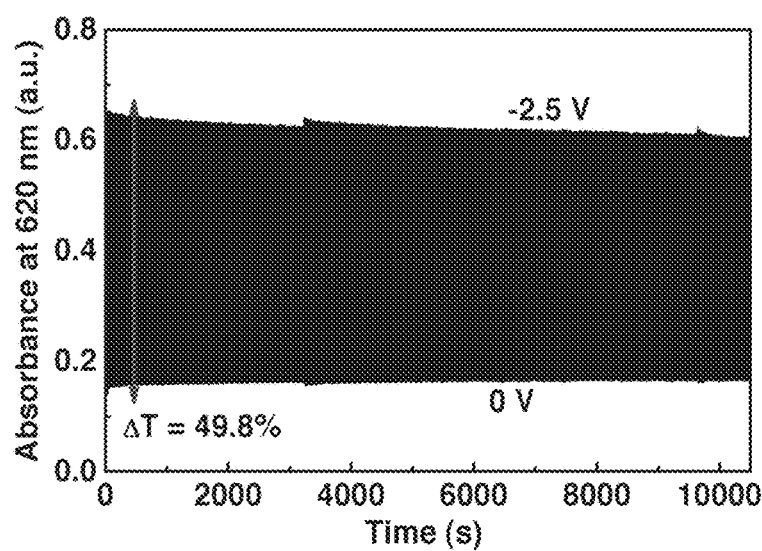

Moreover, this ECD exhibits very stable cycling stability as seen in FIG. 5C. Initially, the change in transmittance (ΔT) of the ECD at 620 nm reached close to 50% while the coloring and bleaching response times were 1.1 second and 6.3 seconds respectively. More importantly, very little decay in the optical change was noticed even after being subjected to more than 10,000 s continuous potential switchings between 0 and −2.5 V (i.e. >500 cycles). This demonstrates that a PolyCo-based black-to-transmissive ECD was successfully obtained, which enables its application in EC displays.

<Comparative Example

PolyCo-OH>

In Non-Patent Literature 1, another PolyCo-derived complex, PolyCo-OH, has been fabricated and also shows black-to-transmissive properties. Since the interaction between a d-orbital electron in the PolyCo and OH⁻ has altered the light absorbance behavior of the PolyCo(II), its one-stage color transition from colorless to black was achieved.

In terms of the performance, comparison between the PolyCo-OH complex and the PolyCo-CNT/Fc ECD is shown in Table 2. The response time of the PolyCo-CNT/Fc ECD is one order of magnitude smaller than the PolyCo-OH film. Besides, the colorless state of the PolyCo-CNT/Fc ECD gives a* and b* values that are closer to CIE black.

TABLE 2

| | Comparison with PolyCo-OH | |
|---|---|---|
| | PolyCo-OH film | PolyCo-CNT/Fe ECD |
| Stability | ΔT at 550 nm<br>73% → 69% after 50 cycles | ΔT at 620 nm<br>49.8% → 46.1% after 50 cycle<br>49.8% → 43.7% after 500 cycle |
| Required switching interval time | 30 s | 10 s |
| Response time | $t_b$: 23.6 s | $t_b$: 6.26 s |
| (L*, a*, b*) at | $t_a$: 31.5 s | $t_a$: 1.1 s |
| colorless state | L*: 88, a*: 18, b*: 38 | L*: 86.1, a*: 3.8, b*: 18.2 |
| Electrolysis | May occur | Would not occur |
| Other functionality of dopant | OH don't possess EC property. Fe in the ECD also presents light yellow to dark green electrochromism. | |

Table 3 lists the ECDs fabricated in the above working examples along with the performance of the PolyCo-OH thin film. All of the inventive examples give the a* and b* values closer to the origin at the colorless state. This reveals that a better transmissive property was obtained by harnessing the PolyCo(III) instead of harnessing the interaction between the PolyCo(II) and OH⁻. On the other hand, the response times achieved by the present invention were one order of magnitude shorter as compared with those of the PolyCo-OH thin film.

TABLE 3

| | Comparison of EC performances of all examples | | | |
|---|---|---|---|---|
| Materials | Fully reduced potential/colorless state potential (V) | Stability (colorless to black) | (L*, a*, b*) at fully reduced state/ (L*, a*, b*) at colorless state | Response time (fully reduced state to colorless state): $t_c/t_b$ (s) |
| PolyCo thin film | — | — | Colorless state hard to achieve | — |
| PolyCo-OH thin film | −1.3/0 (vs. Ag/AgCl) | >50 cycles | L*: 32, a*: 0, b*: 8/<br>L*: 88, a*: 18, b*: 38 | 31.5/23.6 |
| PolyCo/Fe(CN)₆ ECD | −1.5/0 | Colorless state can be retained but long-term stability is poor | L*: 74.7, a*: 2.6, b*: 6.0/<br>L*: 92.1, a*: −0.5, b*: 9.0 | 2.6/4.6 |
| PolyCo-CNT/Fc ECD | −2.5/0 | >500 cycle | L*: 86.1, a*: 3.8, b*: 18.2/<br>L*: 57.8, a*: −5.8, b*: 9.8 | 1.1/6.3 |

INDUSTRIAL APPLICABILITY

The redox-complementary electrochromic device according to the present invention contains a very promising material for various display devices.

What is claimed is:

1. A redox-complementary electrochromic device exhibiting black-to-transmissive switching, wherein the device comprises an electrochromic layer and a redox-active material layer sandwiched between a transparent first electrode formed on a transparent first substrate and a transparent secondary electrode formed on a transparent secondary substrate, said electrochromic layer comprising an electrochromic Co-based metallo-supramolecular polymer represented by the formula (I), and said redox active material being capable of reacting with the electrochromic material to change the electrochromic material from black state into colorless transmissive state,

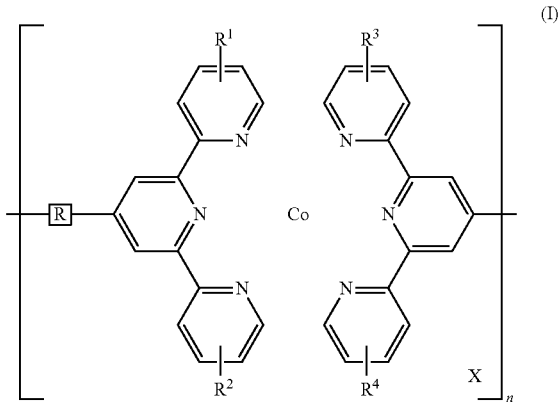

where in the formula (I), X represents a counter anion, R represents a single bond or a spacer comprising a carbon atom and a hydrogen atom, each of $R^1$ to $R^4$ independently represents a hydrogen atom or a substituent group, and n represents an integer of from 2 to 5000, which indicates a degree of polymerization.

2. The electrochromic device according to claim 1, wherein the redox active material is at least one compound selected from the group comprising ferricyanide salts, ferrocene, and (2,2,6,6-Tetramethylpiperidin-1-yl)oxyl.

3. The electrochromic device according claim 1, wherein a concentration of the redox active material in the redox-active material layer ranges from 0.05 mol/L to 2 mol/L.

4. The electrochromic device according to claim 1, wherein the electrochromic layer further comprises carbon nanotubes.

5. The electrochromic device according to claim 4, wherein the carbon nanotubes are contained in an amount of from 0.01 to 0.1 wt % based on a weight of the electrochromic layer.

6. The electrochromic device according to claim 1, wherein the redox-active material layer comprises an electrolyte and a non-aqueous solvent capable of dissolving both the redox-active material and the electrolyte therein.

7. The electrochromic device according claim 2, wherein a concentration of the redox active material in the redox-active material layer ranges from 0.05 mol/L to 2 mol/L.

8. The electrochromic device according to claim 2, wherein the electrochromic layer further comprises carbon nanotubes.

9. The electrochromic device according to claim 3, wherein the electrochromic layer further comprises carbon nanotubes.

10. The electrochromic device according to claim 2, wherein the redox-active material layer comprises an electrolyte and a non-aqueous solvent capable of dissolving both the redox-active material and the electrolyte therein.

11. The electrochromic device according to claim 3, wherein the redox-active material layer comprises an electrolyte and a non-aqueous solvent capable of dissolving both the redox-active material and the electrolyte therein.

12. The electrochromic device according to claim 4, wherein the redox-active material layer comprises an electrolyte and a non-aqueous solvent capable of dissolving both the redox-active material and the electrolyte therein.

13. The electrochromic device according to claim 5, wherein the redox-active material layer comprises an electrolyte and a non-aqueous solvent capable of dissolving both the redox-active material and the electrolyte therein.

* * * * *